US007099051B2

(12) United States Patent
Silverbrook

(10) Patent No.: US 7,099,051 B2
(45) Date of Patent: Aug. 29, 2006

(54) HAND HELD MOBILE COMMUNICATIONS DEVICE WITH AN IMAGE SENSOR, A PRINTER AND AN INTERFACE FOR INTERROGATING AN AUTHENTICATION MECHANISM OF A CARTRIDGE INSERTED INTO THE RECEPTACLE

(75) Inventor: Kia Silverbrook, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 57 days.

(21) Appl. No.: 10/920,225

(22) Filed: Aug. 18, 2004

(65) Prior Publication Data

US 2005/0012854 A1    Jan. 20, 2005

Related U.S. Application Data

(63) Continuation of application No. 10/659,025, filed on Sep. 11, 2003, which is a continuation of application No. 09/436,589, filed on Nov. 9, 1999, now Pat. No. 6,628,430.

(30) Foreign Application Priority Data

Nov. 9, 1998 (AU) ........................ PP7021

(51) Int. Cl.
H04N 1/024 (2006.01)
(52) U.S. Cl. .................. 358/473; 358/471; 358/296; 379/428.01; 379/433.01
(58) Field of Classification Search ........ 358/471–474, 358/296; 235/380, 472.01; 379/428.01, 379/433.01; 400/482; 347/109, 2
See application file for complete search history.

(56) References Cited

U.S. PATENT DOCUMENTS 5,179,936 A    1/1993    O'Hara et al.
5,294,782 A *  3/1994    Kumar ................. 235/380
5,442,387 A    8/1995    Loofbourow et al.
5,493,409 A    2/1996    Maeda et al.
5,625,669 A    4/1997    McGregor et al.
5,664,013 A    9/1997    Rossi
6,048,269 A    4/2000    Burns et al.

(Continued)

FOREIGN PATENT DOCUMENTS

JP    09-113990 A    5/1997

(Continued)

OTHER PUBLICATIONS

U.S. Appl. No. 09/436,589, Silverbrook et al.

Primary Examiner—Thomas D. Lee
Assistant Examiner—Heather D Gibbs

(57) ABSTRACT

A handheld mobile image-sensing device comprising:
  a support structure;
  an image sensor positioned on the support structure for sensing an image;
  a display positioned on the support structure and operatively connected to the image sensor for displaying the image sensed by the image sensor;
  a printing mechanism positioned on the support structure and operatively connected to the image sensor to print the image sensed by the image sensor;
  a receptacle for receiving an ink cartridge containing at least one ink for supply to the printing mechanism, the receptacle including an interface for interrogating an authentication mechanism of the cartridge; and
  a remote transmission arrangement positioned on the support structure and operatively connected to the image sensor to transmit data representing the image.

6 Claims, 16 Drawing Sheets

U.S. PATENT DOCUMENTS

| | | |
|---|---|---|
| 6,064,492 A | 5/2000 | Eldridge et al. |
| 6,069,711 A | 5/2000 | Iwata |
| 6,095,633 A | 8/2000 | Harshbarger et al. |
| 6,116,715 A | 9/2000 | Lefebvre et al. |
| 6,119,931 A | 9/2000 | Novogrod |
| 6,126,268 A | 10/2000 | Askeland et al. |
| 6,166,826 A | 12/2000 | Yokoyama |
| 6,170,943 B1 | 1/2001 | Wen et al. |
| 6,172,688 B1 | 1/2001 | Iwasaki |
| 6,219,229 B1 | 4/2001 | Lee |
| 6,234,389 B1 | 5/2001 | Valliani et al. |
| 6,241,350 B1 | 6/2001 | Otsuka et al. |
| 6,256,666 B1 | 7/2001 | Singhal |
| 6,405,055 B1 | 6/2002 | Silverbrook et al. |
| 6,731,952 B1 | 5/2004 | Schaeffer et al. |

FOREIGN PATENT DOCUMENTS

| | | |
|---|---|---|
| WO | WO 97/04353 A | 2/1997 |
| WO | WO 97/50243 A | 12/1997 |

* cited by examiner

HAND HELD MOBILE COMMUNICATIONS DEVICE WITH AN IMAGE SENSOR, A PRINTER AND AN INTERFACE FOR INTERROGATING AN AUTHENTICATION MECHANISM OF A CARTRIDGE INSERTED INTO THE RECEPTACLE

This is a Continuation Application of U.S. application Ser. No. 10/659,025 filed Sep. 11, 2003, which is a Continuation Application of U.S. application Ser. No. 09/436,589 filed Nov. 9, 1999, now issued U.S. Pat. No. 6,628,430.

FIELD OF THE INVENTION

The present invention relates to printing systems and more particularly to a handheld mobile communications device having an image sensor and a printer. The invention has been developed primarily for use with ultra compact mobile phones such as Personal Handyphone System (PHS) phones or other close network cellular devices. However, it will be appreciated by those skilled in the art, that the invention is equally applicable to all other types of hand held mobile phones including existing Global System for Mobile communication (GSM) phones, the proposed new General packet radio service (GPRS) and Wideband Code-Division Multiple Access (WCDMA) phones, satellite phones and the like.

SUMMARY OF THE INVENTION

According to a first aspect of the invention, there is provided a handheld mobile image-sensing device that comprises a support structure;

an image sensor positioned on the support structure for sensing an image;

a display positioned on the support structure and operatively connected to the image sensor for displaying the image sensed by the image sensor;

a printing mechanism that is positioned on the support structure and operatively connected to the image sensor to print the image sensed by the image sensor; and a remote transmission arrangement positioned on the support structure and operatively connected to the image sensor to transmit data representing the image.

The image sensor may be in the form of a camera device capable of storing images on demand.

The printing mechanism may include a pagewidth printer and processing circuitry to control operation of the printer.

The printer may include a pagewidth printhead and an ink distribution unit that is positioned on the printhead to supply ink to the printhead.

The image sensing device may include a print media feed mechanism for feeding print media relative to the printhead so that a printing operation can be carried out on the print media.

The remote transmission arrangement may be in the form of a mobile telephone system.

The display may be a color, LCD display.

In accordance with a second aspect of the present invention, there is provided a hand held mobile phone device with integral internal print apparatus, said device comprising:

a mobile telephone unit for transmitting and receiving signals;

processing means for processing said received and transmitted signals into a printable form;

a printhead and ink distribution unit assembly attached to said processing means for printing out said processed signals onto a print media; and print media feed means to feed print media received from a supply external of said phone device to said printhead for printing of said processed signal information thereon.

Preferably, the print media comprises paper or card sheets.

The printhead can comprise a single unit of the width of the print media and may be formed via semiconductor fabrication techniques.

Desirably, the printhead or printhead and ink distribution unit assembly is detachable from the phone device. In the preferred form the printhead is part of a sub-assembly also including an ink distribution unit and ink supply, hereinafter referred to as a printhead and ink supply module.

The printhead can comprise a full color printhead attached via an ink distribution unit to a series of ink supply reservoirs to supply separate colors to each of the colors of the printhead.

In a preferred form, the printhead comprises an array of ink ejection nozzle arrangements wherein liquid can be ejected by means of corresponding actuators attached to ejection paddles associated with each of the nozzle arrangements. Preferably, the actuators are thermal bend actuators.

The printhead and ink supply module preferably includes an ink distribution unit connected with a series of attached ink supply reservoirs, with a first reservoir being substantially larger than the others which is preferably used to store black ink. The printhead and the ink distribution unit assembly or printhead and ink supply module optionally form a releasable snap fit with the mobile telephone unit.

The printhead or printhead and ink distribution unit assembly also preferably includes an authentication means that in the preferred embodiment is in the form of an authentication chip. This enables the use of only approved consumables with the phone device and also optionally records use and consumption data and which may be used to allow for only a predetermined amount of usage of the printhead or printhead and ink supply module.

The print media can be fed into the printer phone manually. Alternatively, a print media dispensing device can be used that preferably includes:

a print media storage region having a dispensing outlet;

a printer phone cradle to support said printer phone and align a print media inlet thereon with the dispensing outlet of the print media storage region; and a dispensing ejector mechanism operable to eject a predetermined quantity of print media through the dispensing outlet and into the printer phone print media inlet for engagement with an associated print media feed means provided in said phone.

Desirably, the print media is in the form of card or paper sheets.

Preferably, the ejector mechanism comprises a slider operable to select and engage one of the cards or paper sheets and drive it through the dispensing outlet.

Desirably, the print media storage means includes a means to bias a supply of print media disposed therein toward said ejector mechanism and into alignment with said dispensing outlet.

While the preferred telephone unit of the invention is a PHS phone device, the invention is equally applicable to any type of mobile phone utilising any communications system, so long as the transmitted signals can be processed into a printable form. Examples of other suitable phone types and/or communication systems include GSM, CDMA satellite phone systems and third generation Internet connected mobile phone (3G) systems including GPRS & WCDMA.

BRIEF DESCRIPTION OF THE DRAWINGS

A preferred embodiment of the invention will now be described, by way of example only, with reference to the accompanying drawings in which.

DETAILED DESCRIPTION OF THE INVENTION

In the preferred embodiment illustrated, there is provided a mobile phone having an internal printer which includes a separately detachable printhead and ink supply module. The printer phone can be produced at or close to a standard size phone for any system including PHS, GSM and GPRS, thereby conferring a higher level of convenience during operation.

Figure 1:
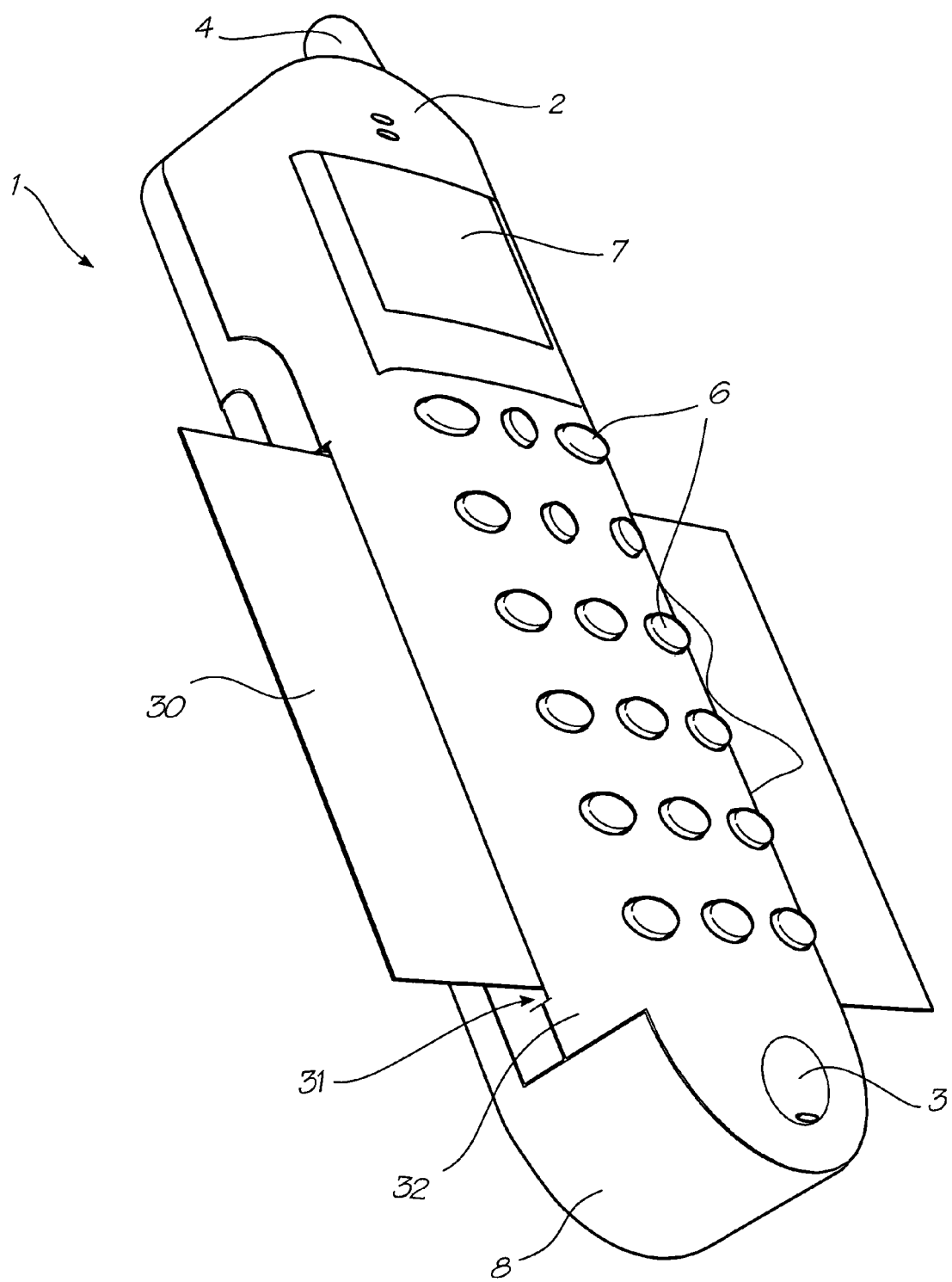
FIG. 1 is a front perspective view of a first embodiment printer phone in accordance with the invention.
Figure 2:
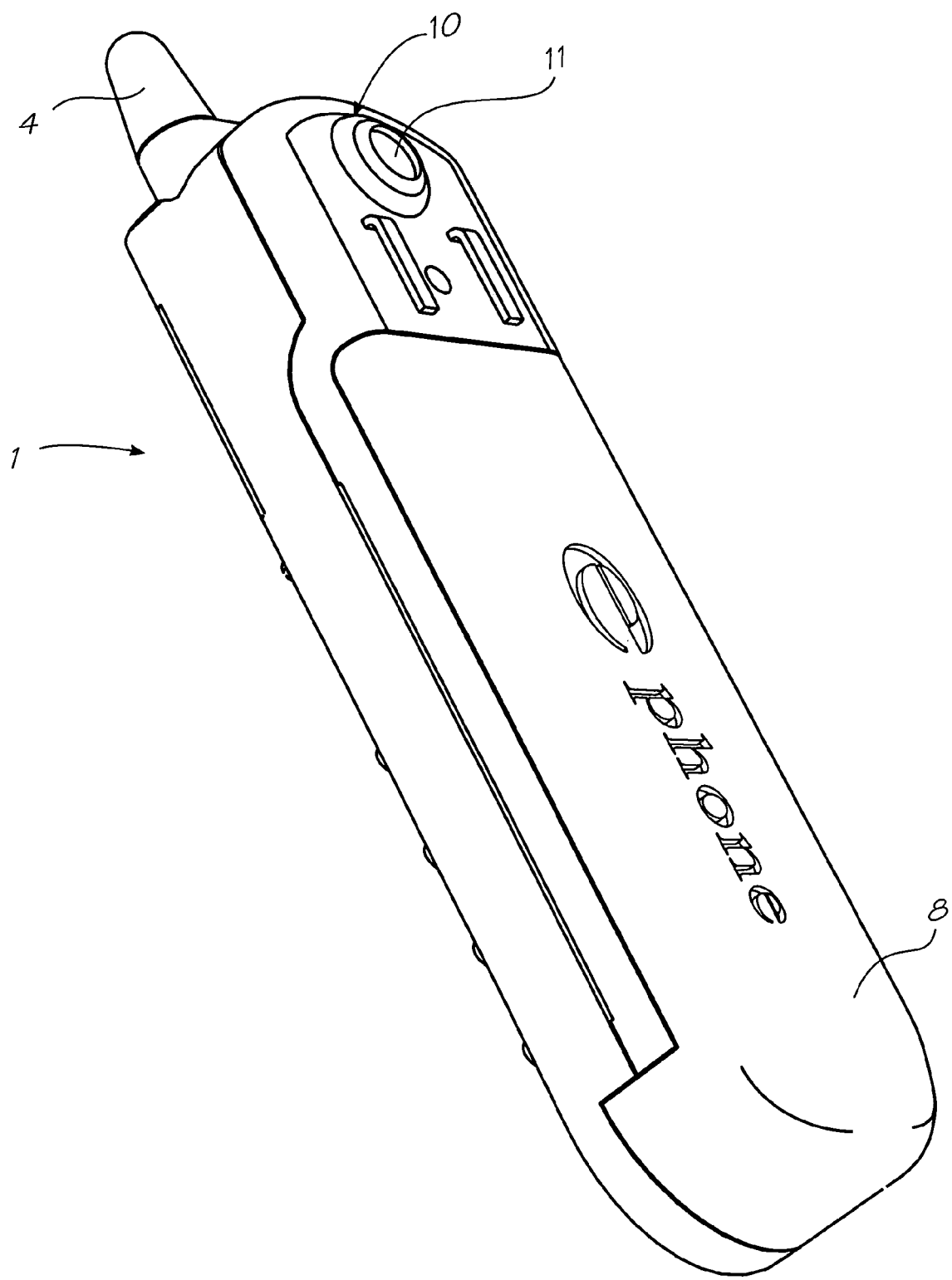
FIG. 2 is a rear perspective view of the phone shown in FIG. 1.
Figure 3:
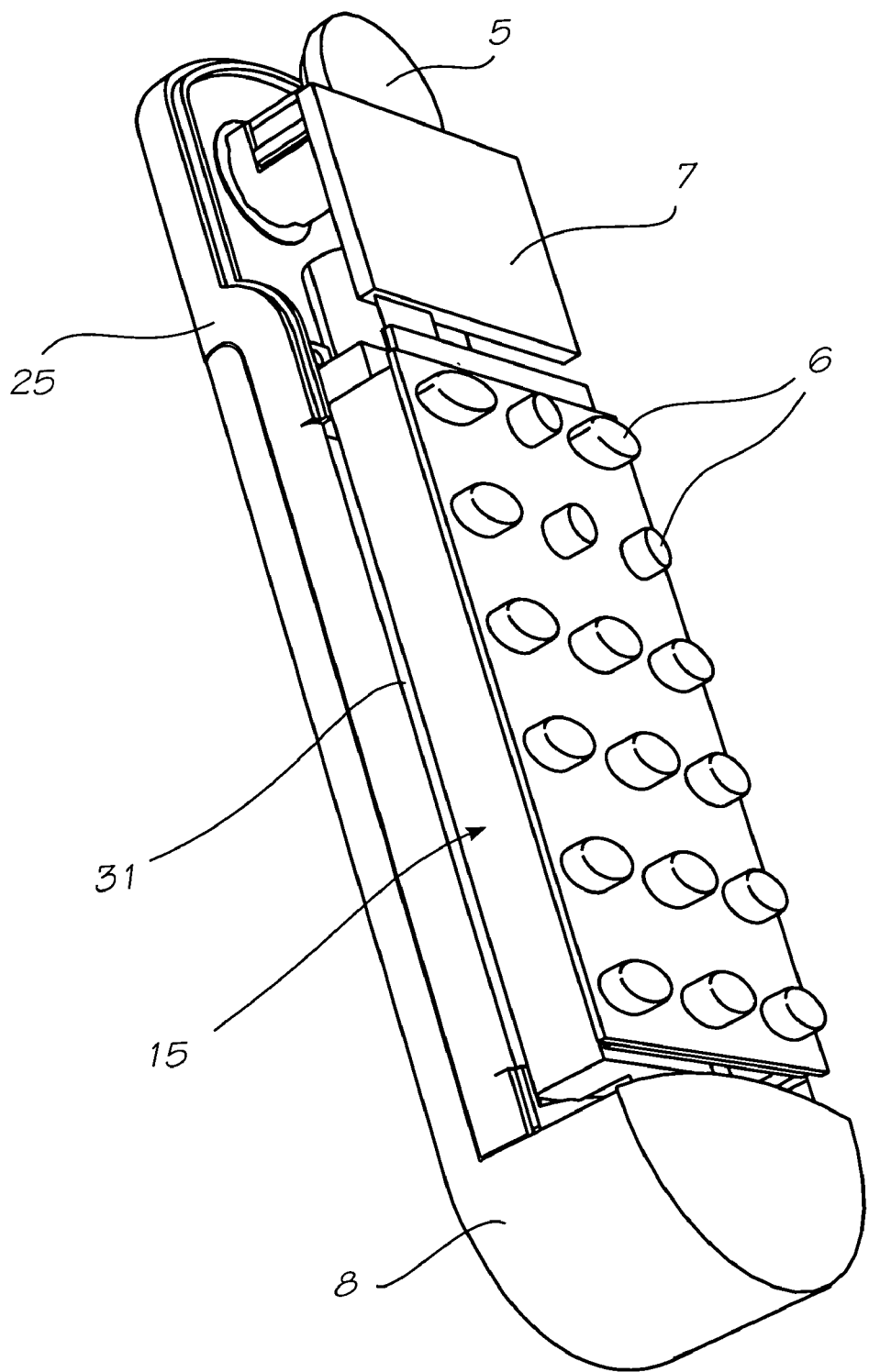
FIG. 3 is a front perspective view-as shown in FIG. 1 with the front outer cover removed.
Figure 4:
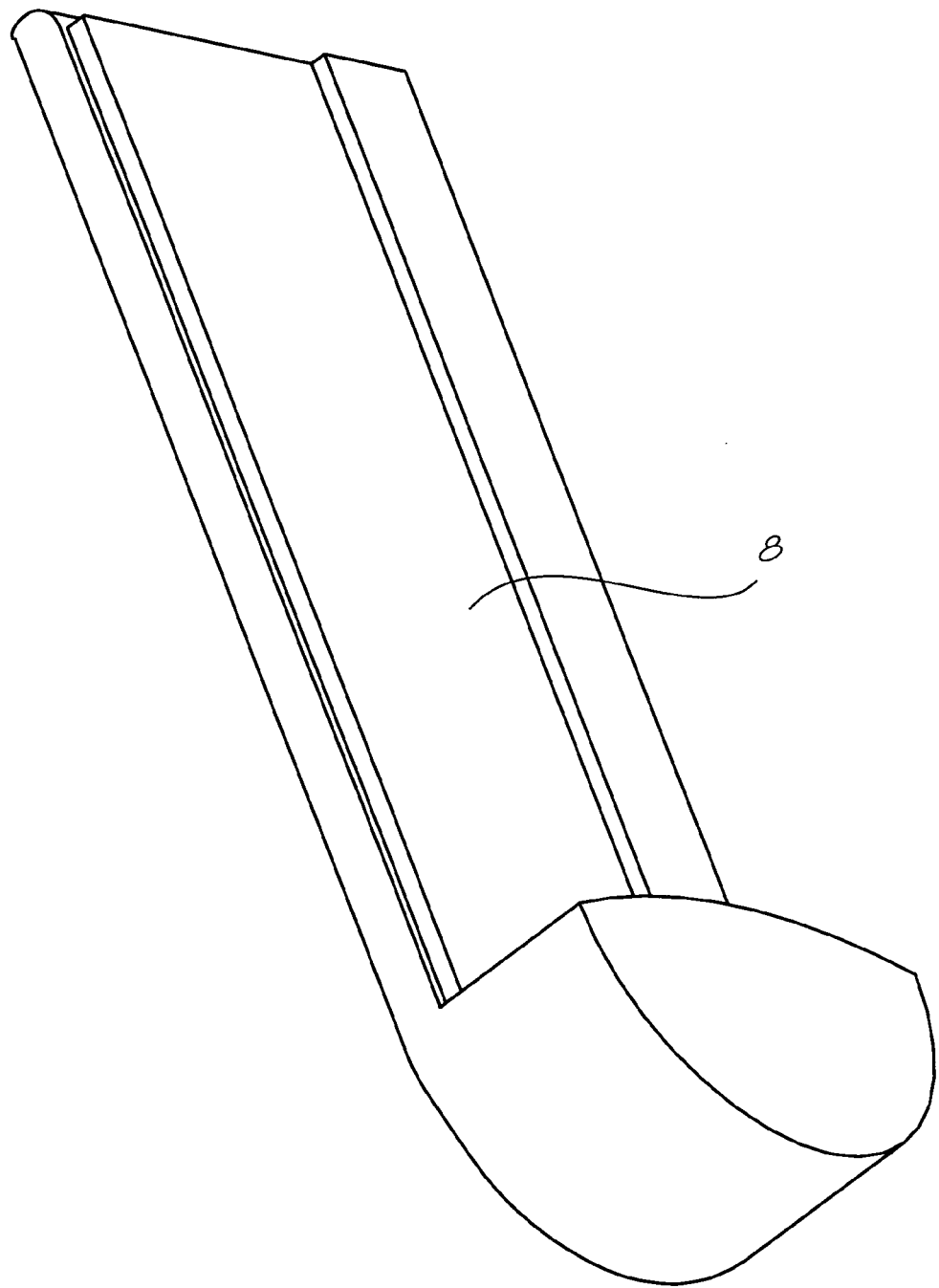
FIG. 4 is a front perspective view of the battery shown in the previous figures.

Turning initially to FIG. 1, there is illustrated the preferred embodiment 1 in the form of a PHS phone and which in many ways looks like and includes the features of a conventional mobile phone of this type including an ear piece 2, microphone 3, aerial 4, loud speaker 5, a series of push buttons 6 and a preferably color LCD screen 7 for the display of information. Also included is a battery 8 as shown in FIG. 4.

The phone 1 can optionally be equipped with a camera device 10 comprising lenses 11 and associated CCD chip or CMOS sensor 12. The CCD or CMOS sensor enables the device to store images on demand, so that the phone can effectively act as a camera device for the printing out of images, or for their capture and forwarding across a mobile phone network. The operation of the relevant part of the internal control electronics can be substantially as set out in the applicant's earlier PCT application WO 99/04551 entitled "A replenishable one time use camera system" the contents of which are incorporated herein by reference. In other embodiments, the camera device may also be configured to enable video conferencing by facilitating simultaneous image processing during phone transmission. A camera function that is mounted for selective movable positioning on the phone device may be useful for this purpose. For example, it may be rotatable between a forward facing camera orientation and a rearward facing video conferencing orientation.

The printer apparatus is shown generally at 15 and comprises a printhead and ink supply module 16 including a printhead 17, an ink supply/distribution unit 18 and a print media feed apparatus 20. The feed apparatus is of a conventional form including a motor 21 with associated gear train 22 which drive a series of feed rollers 23.

Figure 5:
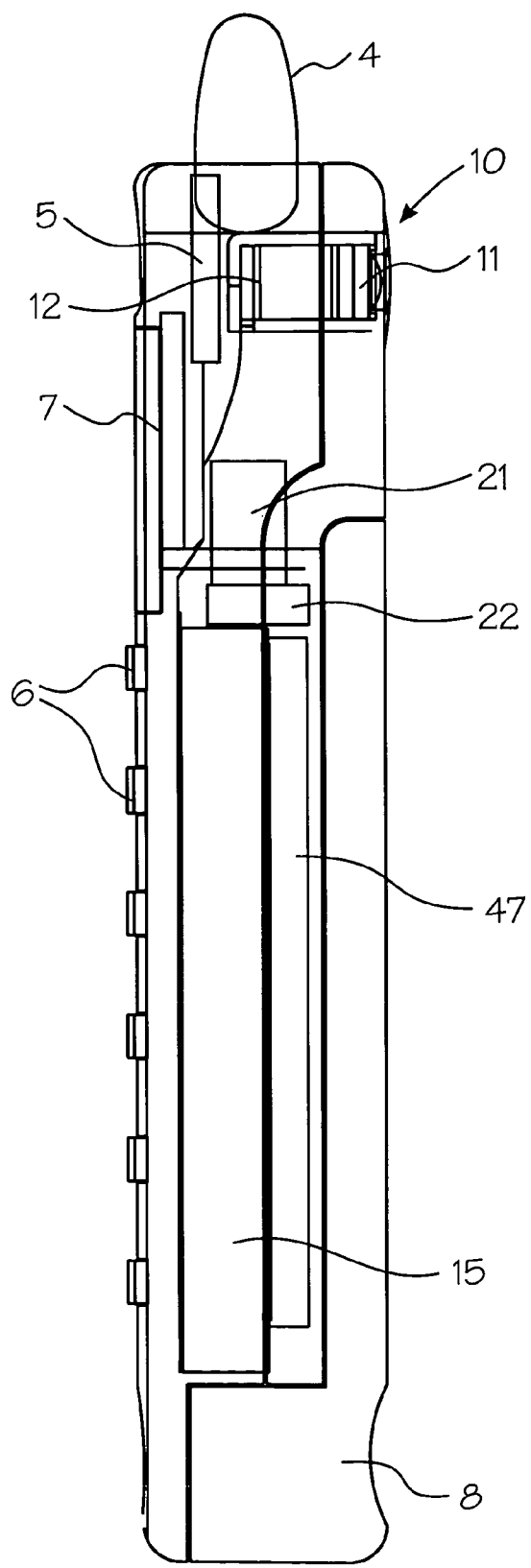
FIG. 5 is a layered sectional right hand side view of the printer phone shown in the previous figures.
Figure 6:
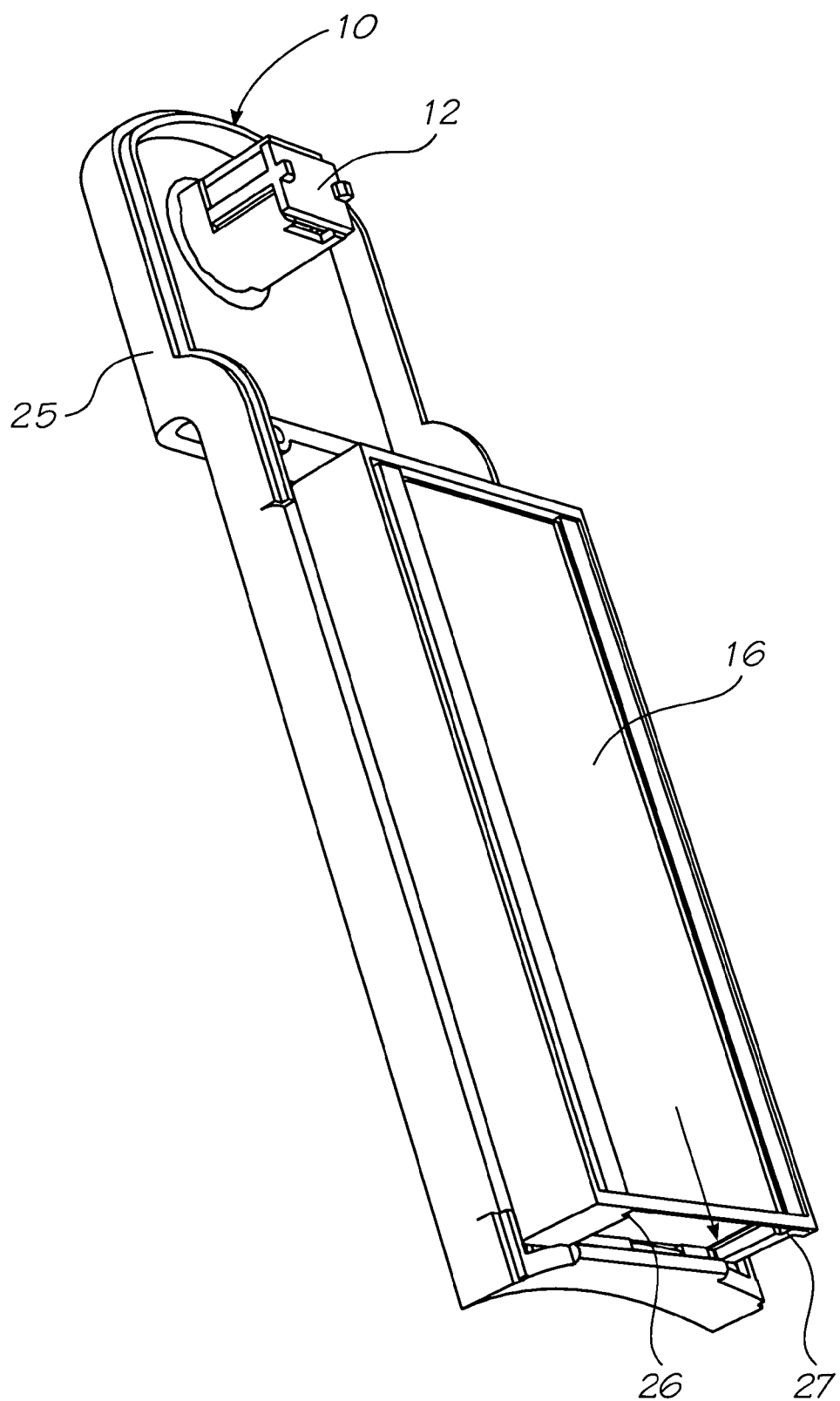
FIG. 6 is a front perspective view of the printer phone sub-chassis and printhead/ink supply module.
Figure 7:
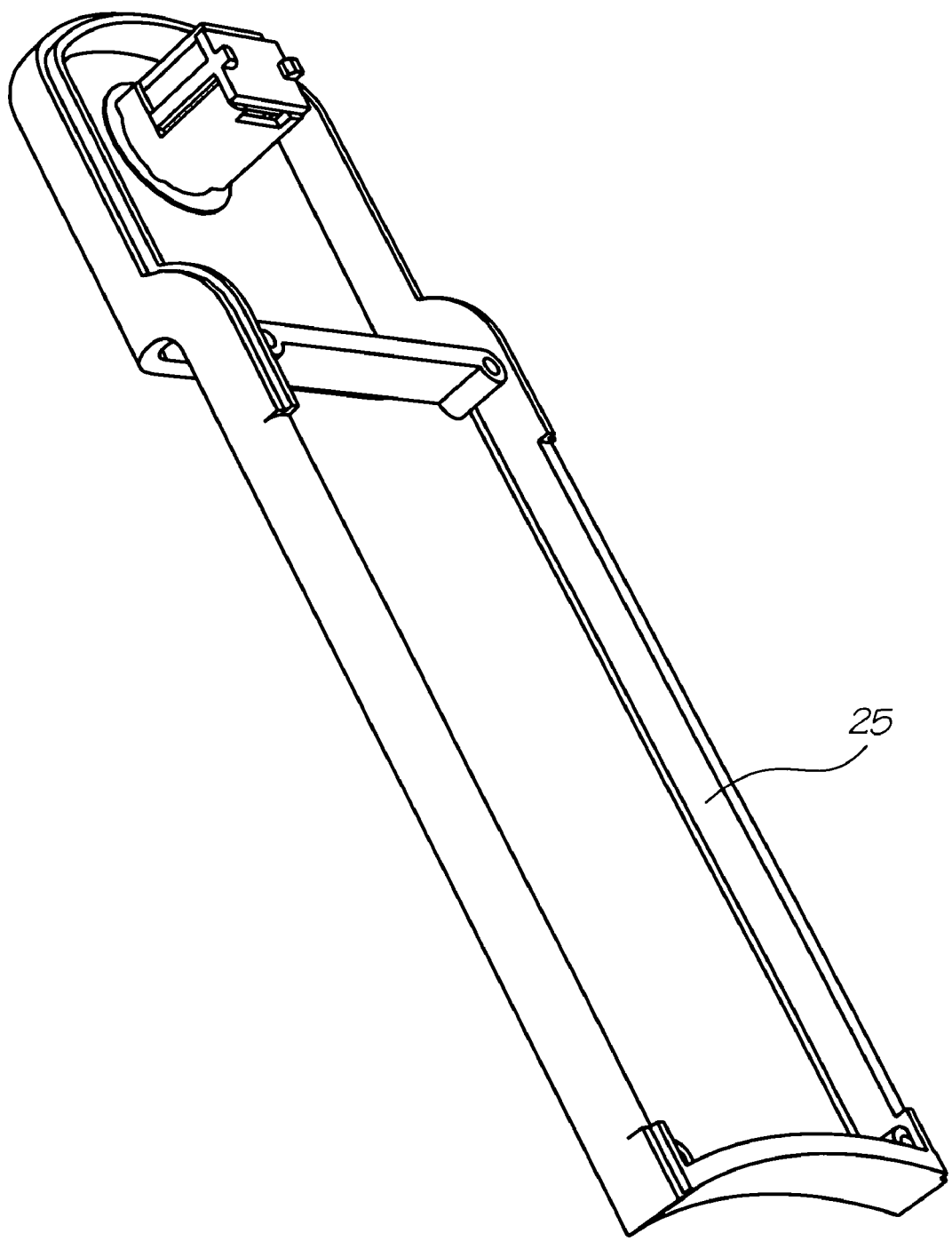
FIG. 7 is a front perspective view of the support chassis shown in FIG. 6.
Figure 9:
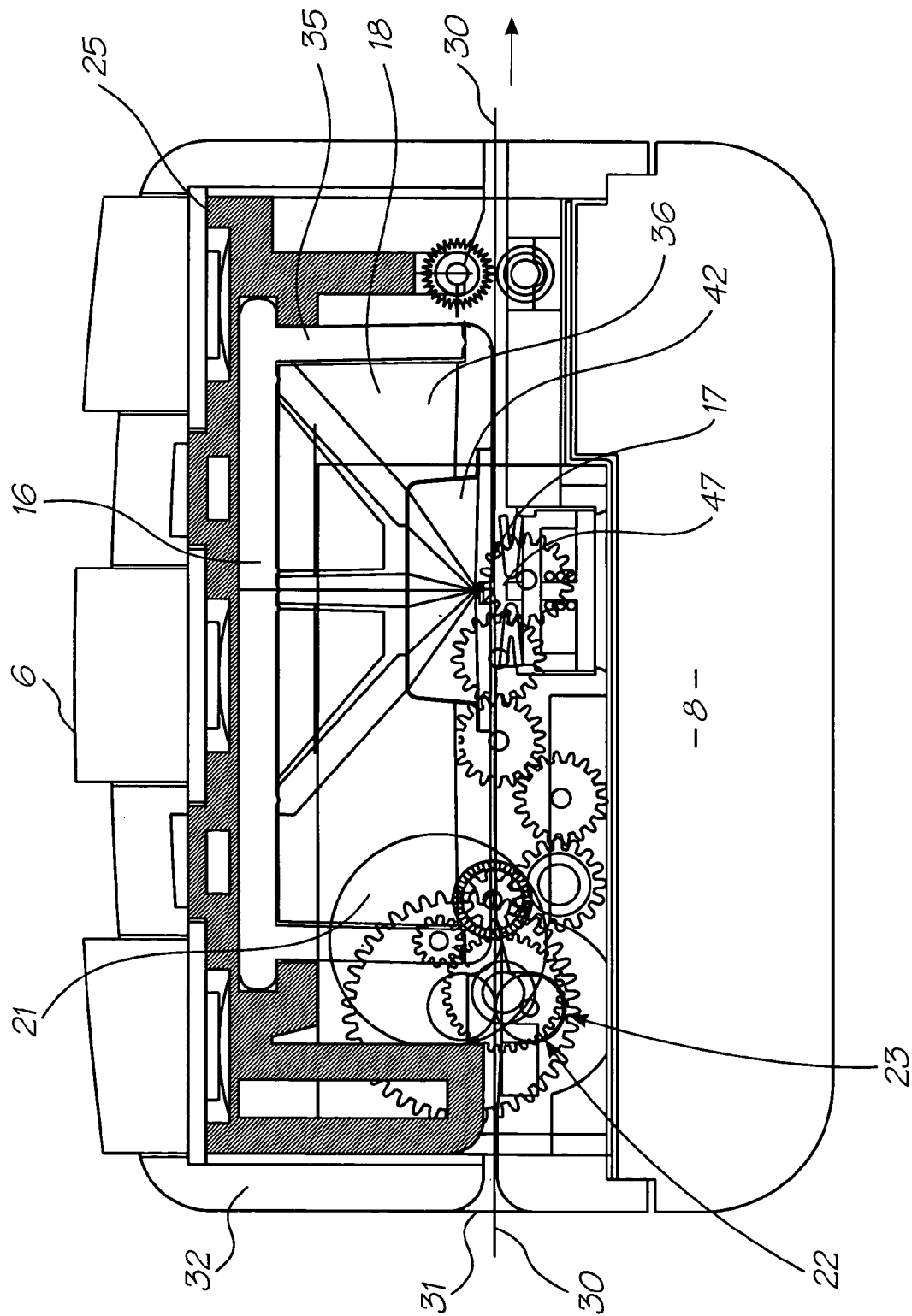
FIG. 9 is a transverse section through the phone unit and printhead/ink supply module.
Figure 10:
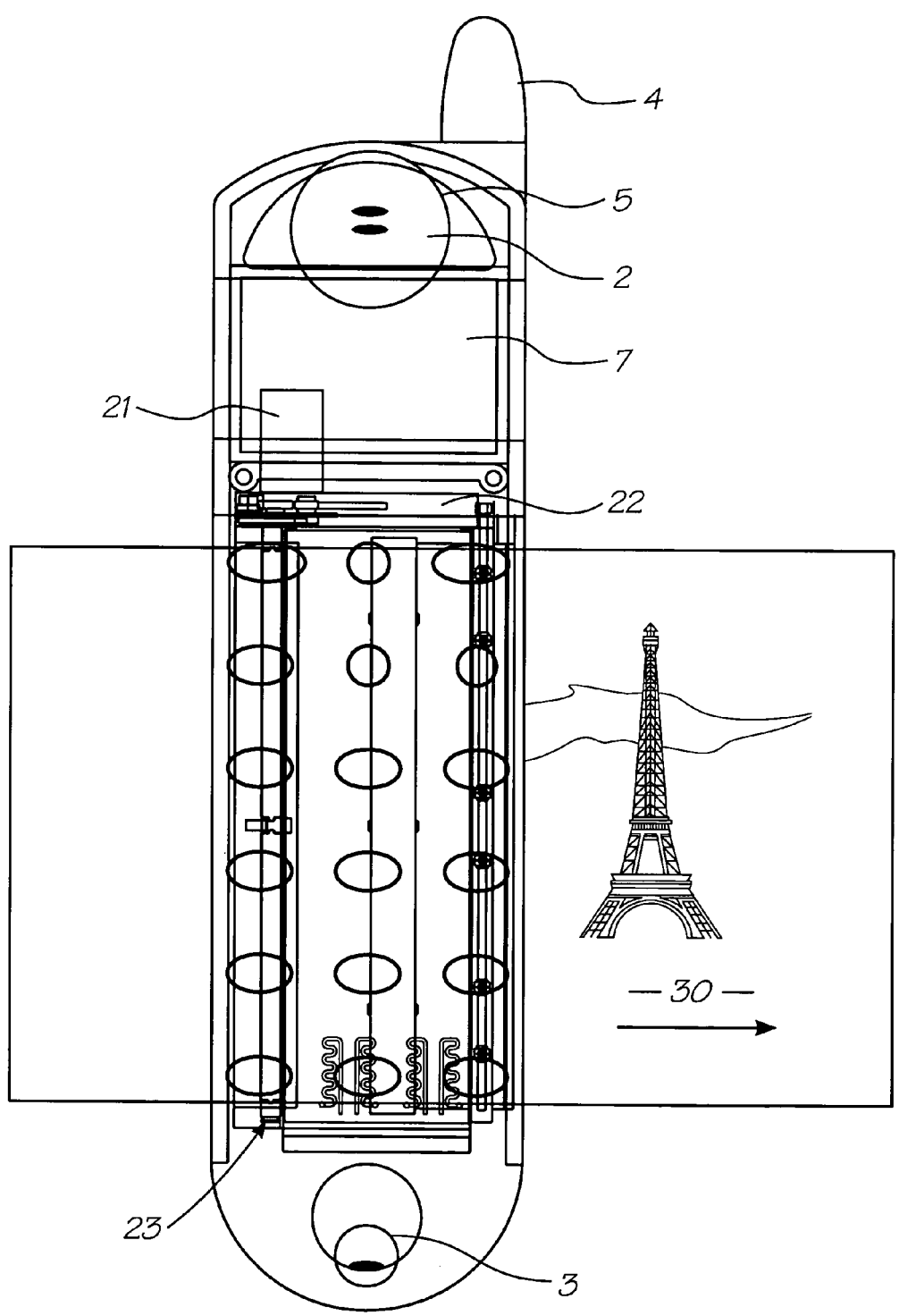
FIG. 10 is a front layered sectional view of the printer phone of the previous figures.
Figure 11:
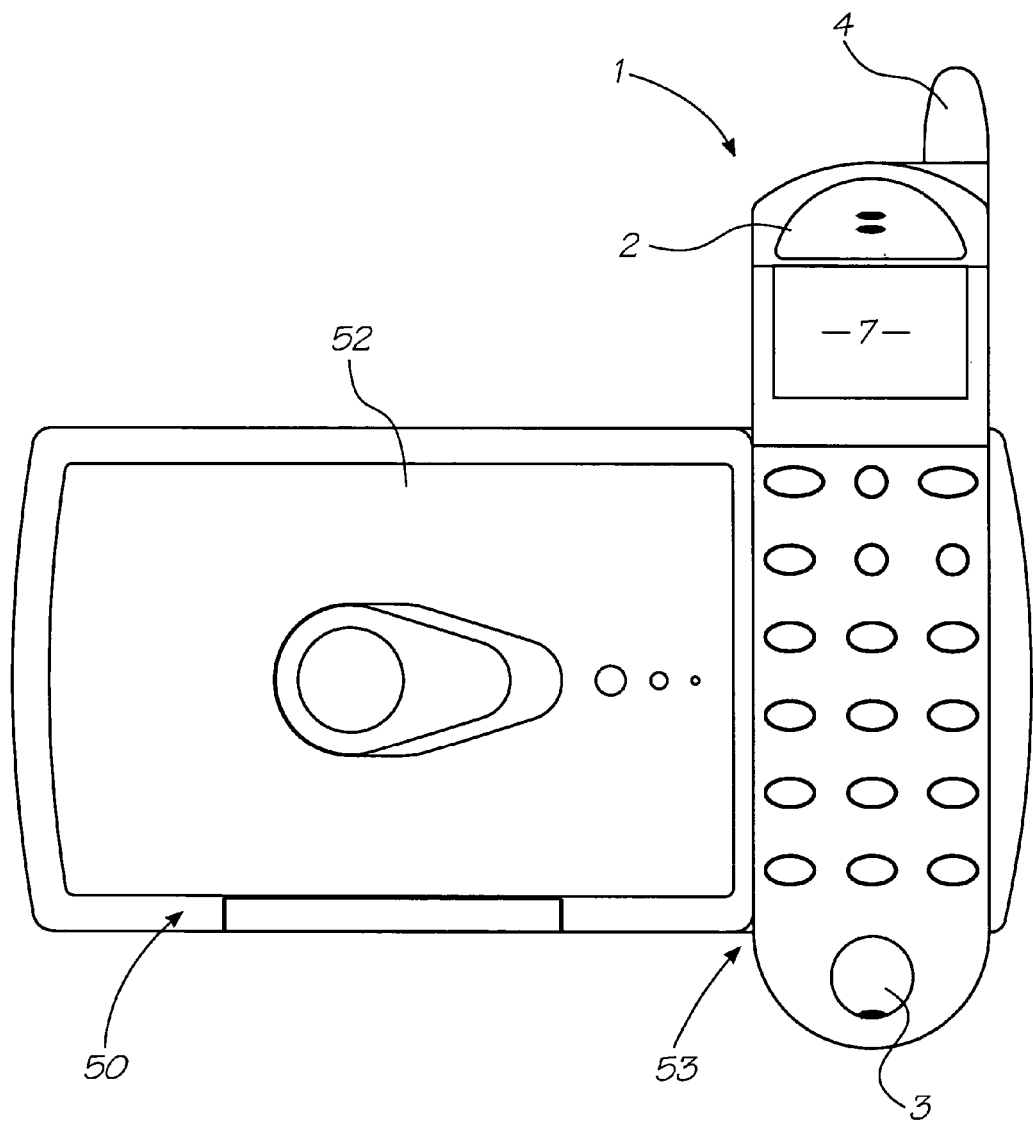
FIG. 11 is a plan view of the phone of the previous figures attached to an associated print media-dispensing device.
Figure 12:
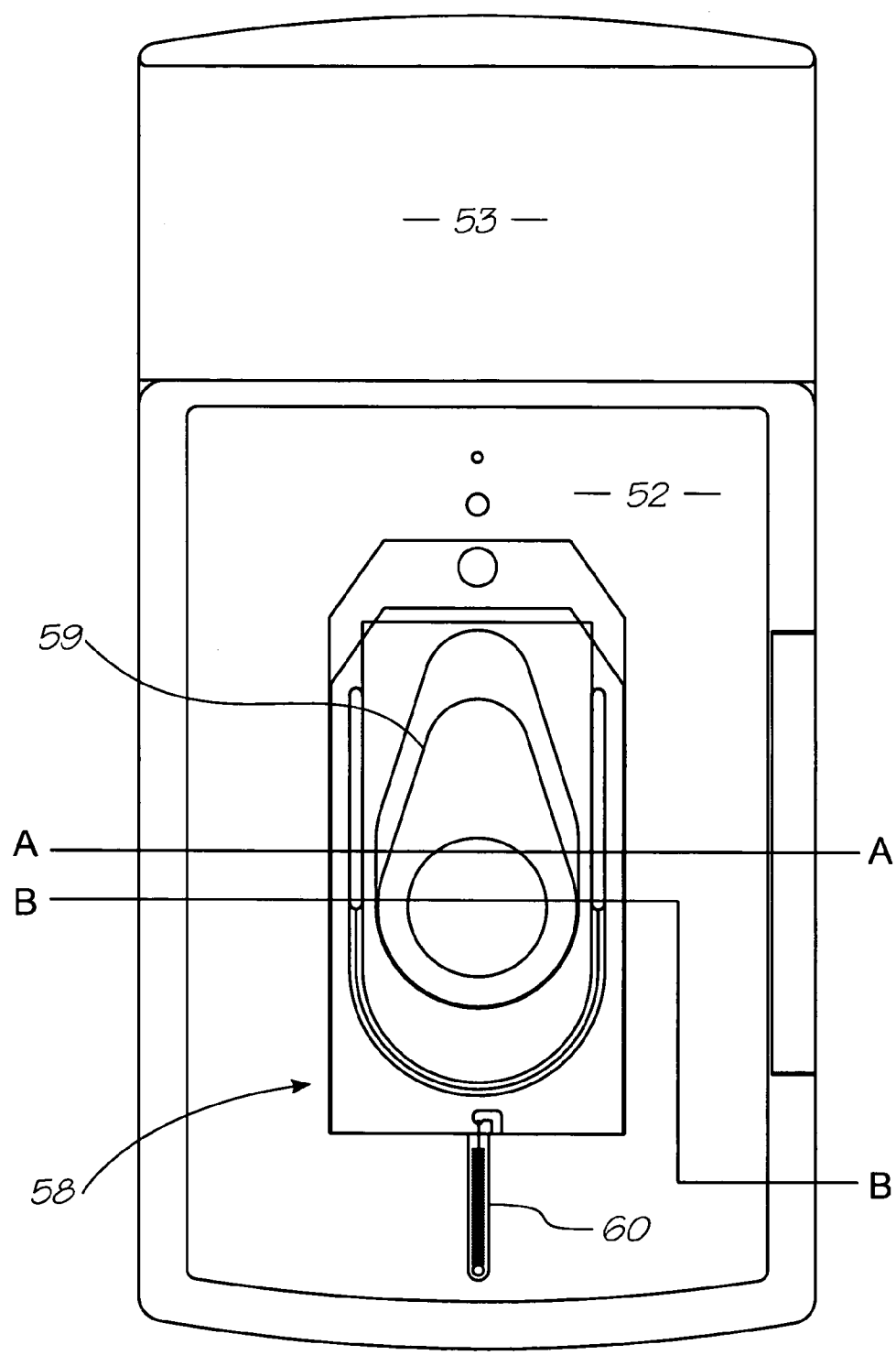
FIG. 12 is a plan view of the print media-dispensing device shown in FIG. 11.
Figure 13:
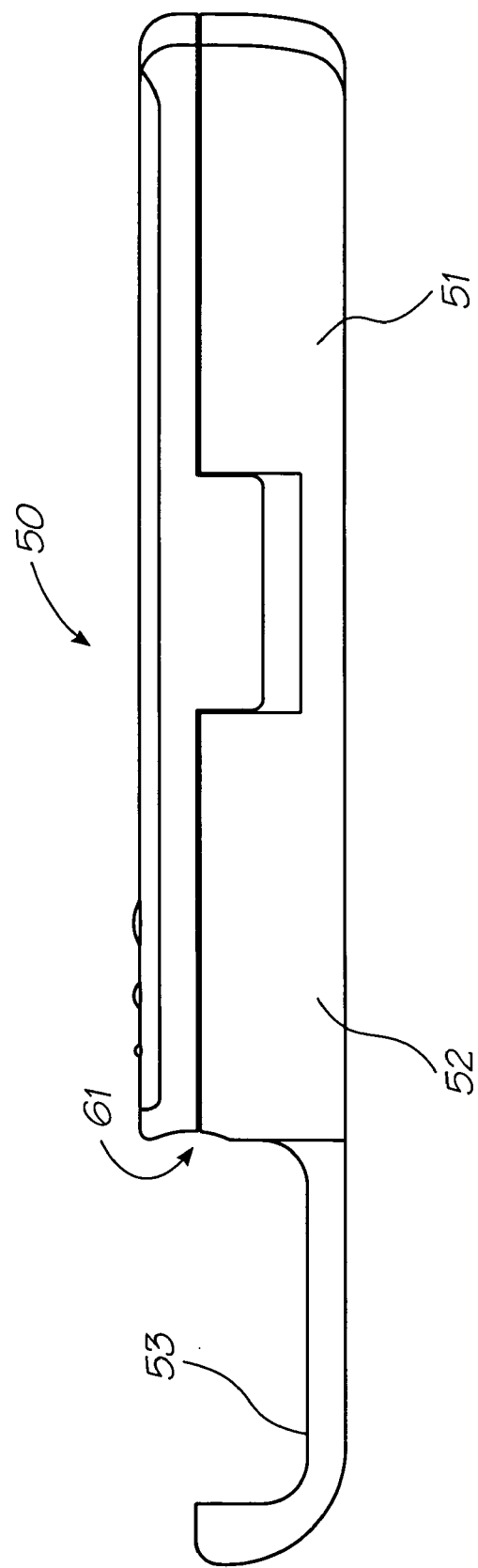
FIG. 13 is a left-hand side view of the print media dispenser shown in FIGS. 11 and 12.

The packaging of the printer apparatus 15 is best shown in FIGS. 5, 6 and 9. In this regard the printer phone 1 is constructed around a rigid chassis molding 25. The chassis is adapted to slidably receive and retain the printhead and ink supply module 16 by means of retaining flanges 26 provided on the outer casing of the printhead and ink supply module 16 which co-operate with under cut channels-27 provided on the chassis molding.

The full operation of the printer apparatus 15 is best illustrated in FIG. 9. In use print media 30, preferably in the form of business card sized paper or card sheets, is fed in through an entry slot 31 provided in the external phone casing 32. This can be done manually or via a dispenser as described hereafter. The card 30 is then picked up by the powered entry feed rollers 23 and delivered to the printhead and ink supply module 16. The printhead and ink supply module 16 can be substantially the same as that disclosed in Australian Provisional Patent No. PP6534 filed 16 Oct., 1998 (U.S. Ser. No. 09/425,419 filed 19 Oct. 1999), the contents of which are also hereby incorporated by crossreference. In such a device, the printhead is in the form of an elongate printhead chip that extends the full length of the print media pathway, so as to print the full width of the print media in a single pass without the need for any printhead traversing mechanisms.

Figure 8:
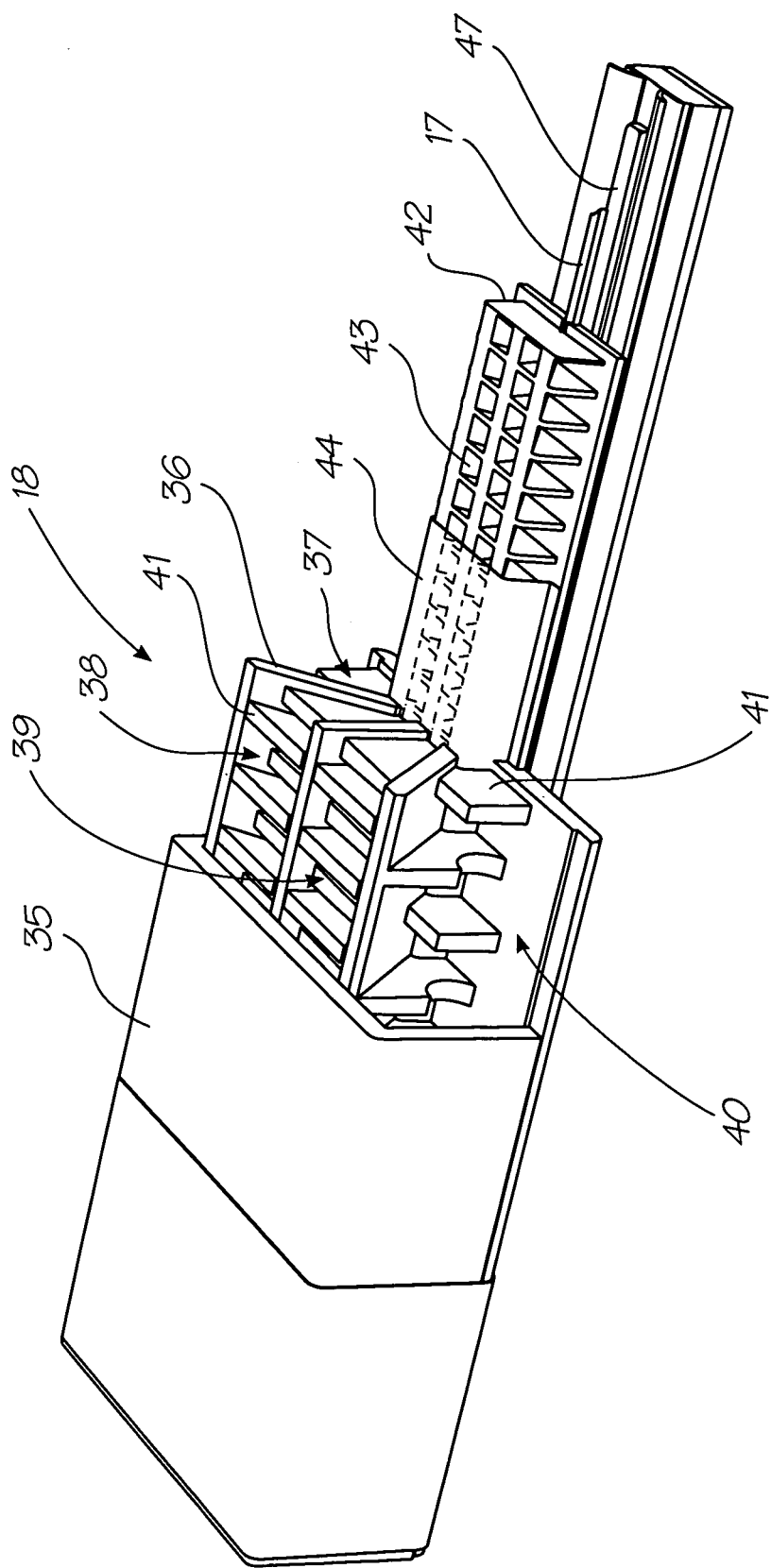
FIG. 8 is a part sectioned front perspective view of the printhead and ink supply module shown in FIG. 6.

In this particular preferred embodiment, the printhead and ink module is formed as a sealed unit which is replaced in its totality after a predetermined amount of usage. The detailed structure of the ink supply and printhead module is shown more clearly in FIG. 8. The ink supply/distribution unit 18 is of a molded multi-part structure including a cover 35, a macro channel molding 36 defining four separate ink supply chambers 37-40 having therein optional flow control baffles 41. Connected with converging outlets of the macro channel molding 36 is a micro-molding 42 which defines similarly converging ink flow nozzles 43 that accurately direct the ink to minute ink supply inlets on the rear of the printhead 17. Optionally, an ink filter 44 is provided between the two moldings. A capping device 47 is also provided as part of the module for sealing and protecting the nozzle outlets when the printer head is not in use. It is estimated that the ink supply will on average be sufficient for printing approximately 1000 pages at 15% coverage of black or 100 photos of 50% coverage of CMYK. An expanded technical description of the printhead and ink supply module can be found in the aforementioned provisional patent specification PP6534 and associated applications.

Figure 16:
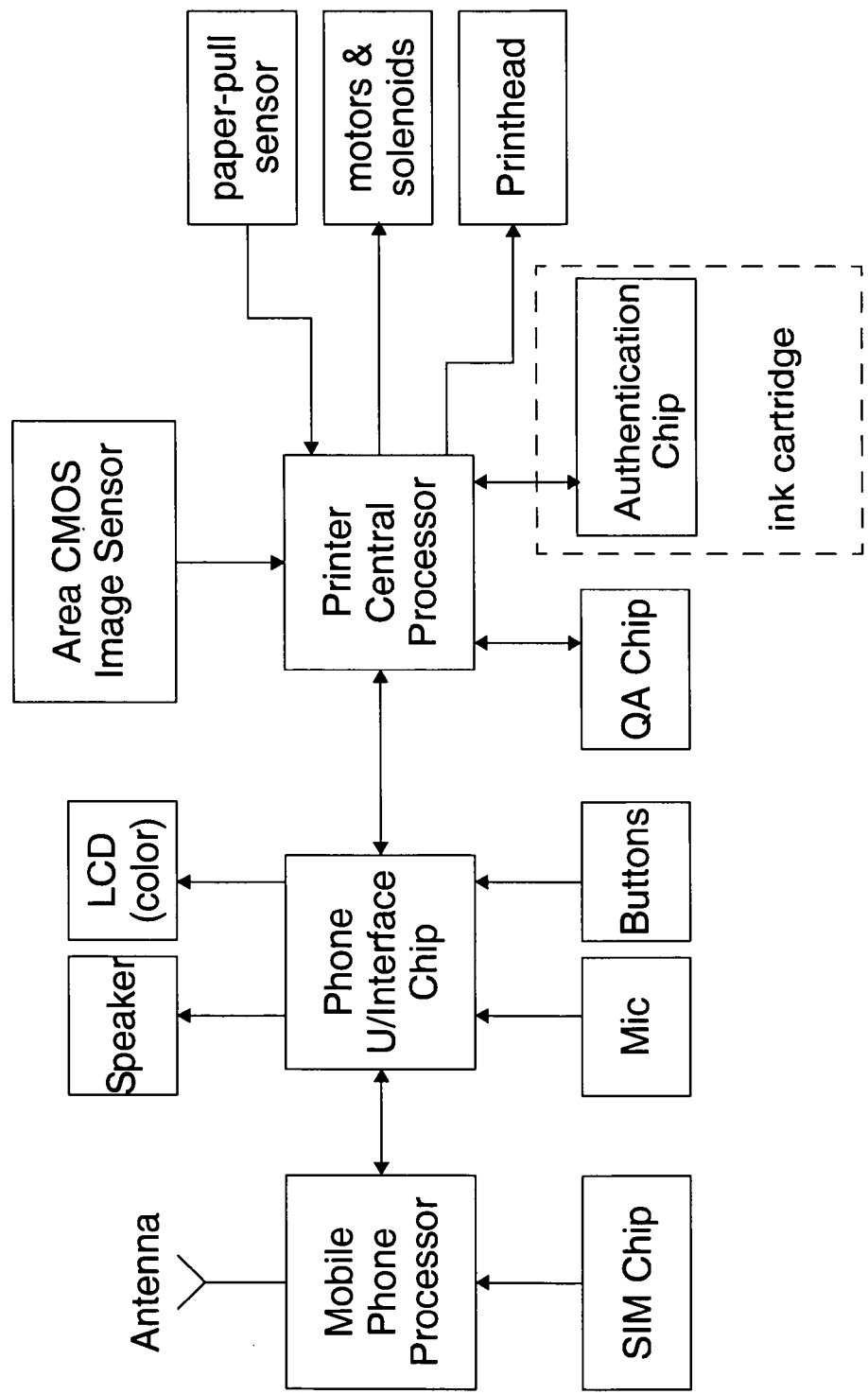
FIG. 16 is a schematic block diagram showing the electrical interconnections.

The mobile phone system can be operated under the control of a series of one or more application specific integrated circuits (ASICS) which incorporate the usual mobile phone capabilities in addition to camera and image processing capabilities. An adaptation of the system outlined in PCT Patent Application PCT/AU98/00544 filed by the present applicant (also incorporated herein by reference) can be utilised in the design of the ASIC. The electrical interconnections for the preferred embodiment are shown schematically as a block diagram in FIG. 16. Other system designs well known to those skilled in this field may also be used.

Referring next to FIGS. 11 to 15 there is illustrated a print media dispenser 50 configured for use with the PHS phone of the previous embodiments. The dispenser comprises a lower molding 51 that defines a media storage and dispensing region 52 and a cradle 53 which supports the printer phone 1 and aligns it with the outlet of the dispenser.

Figure 14:
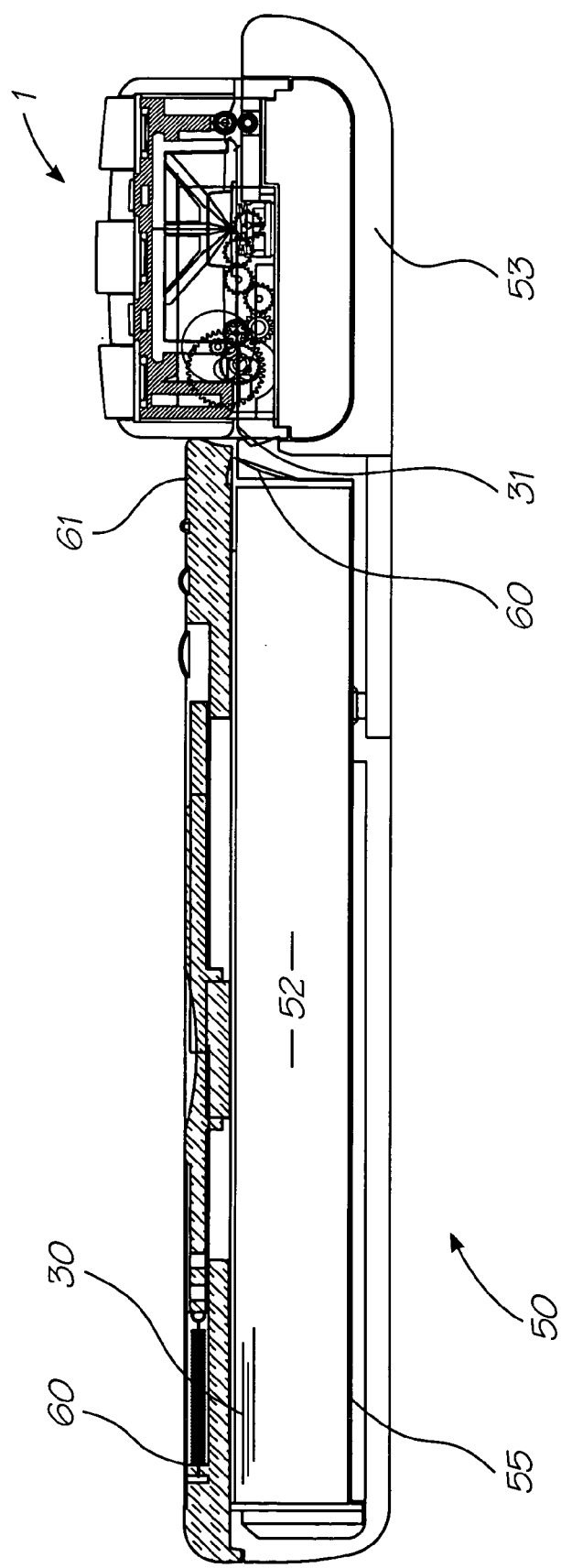
FIG. 14 is a sectional right hand side view of the print media dispenser shown in FIG. 11.
Figure 15:
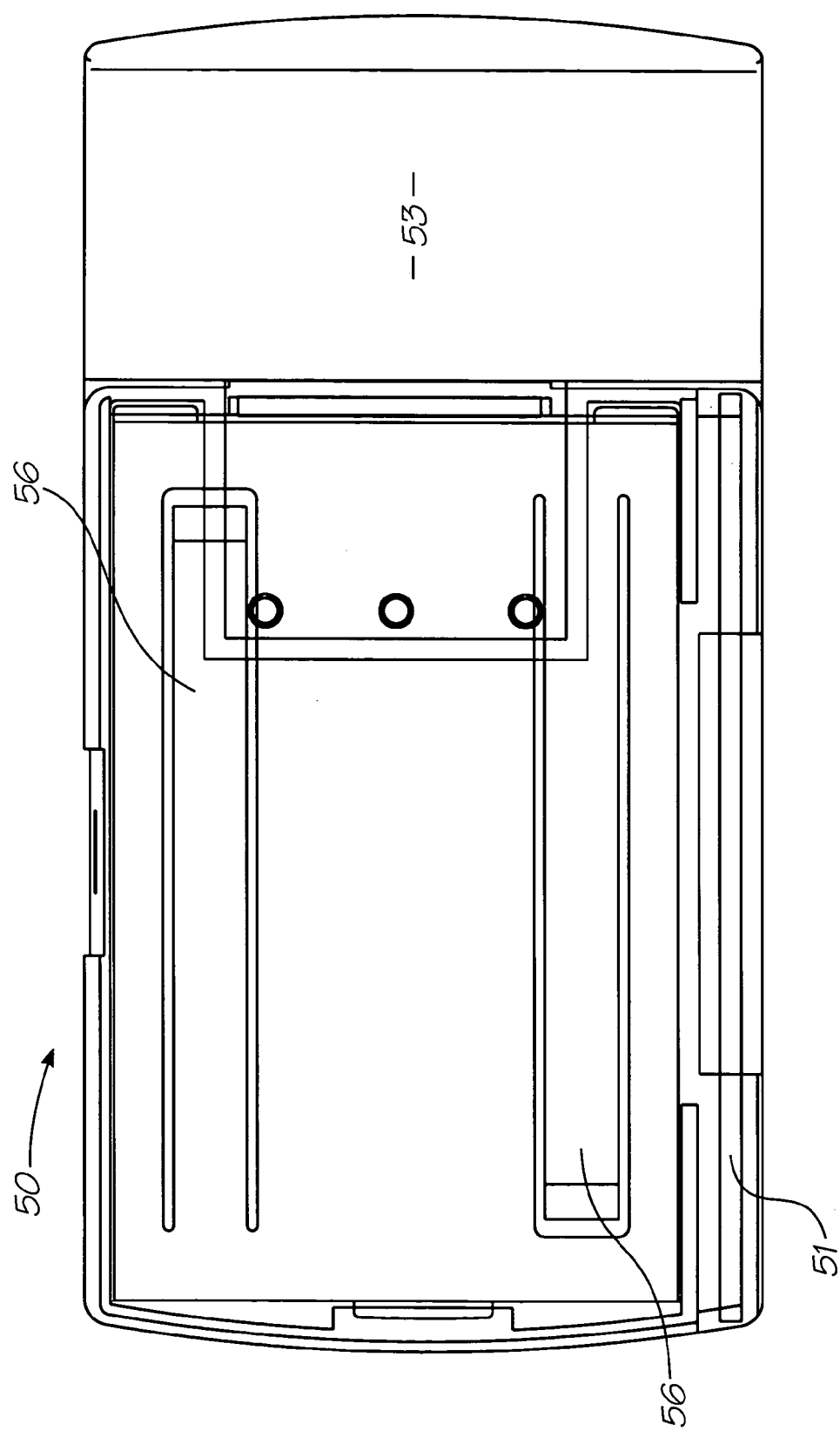
FIG. 15 is a plan view of the print media dispenser shown in FIG. 111 with the upper portion of the casing removed.

The interactive operation of the print media dispenser with the phone 1 is best illustrated in FIG. 14. As can be seen, the dispenser 50 has a storage area 52 in which is disposed a quantity of print media in the form of business card sized paper or card sheets 54. These cards are supported on a metal base plate 55 which is sprung by means of opposed spring fingers 56 as shown in FIG. 15. In this manner, the card supply is constantly biased upwardly toward a media ejector mechanism 58. The ejector mechanism includes an ejector slider 59 which is operable upon manual sliding against a return spring 60 to pick up the top card and feed this out of the dispenser outlet 61 and into the media entry slot 31 on the phone 1. On release, the slider automatically returns to the home position to engage the next card ready for further loading.

Desirably, the printer phone 1 and/or printhead and ink supply module 16 includes an authentication mechanism such as that outlined in the applicant's earlier PCT application no. PCT/AU98/00544 entitled "A camera with an internal printing system". This can be used to ensure not only that an authenticated approved consumable (such as the printhead and ink supply module) is used with the printer phone, but can also be used to store data on the relative usages of the consumable components such as the ink or the printhead itself and can optionally be used to set a predetermined usage for these items. As noted above, the phone device of the invention may be any kind of mobile phone that sends and receives signals in a manner which can be processed into a printable form. Further, while the preferred form described has a printhead and ink distribution unit which has an integrally formed and attached ink supply, the ink supply could be separate and optionally also separately replenishable.

While the invention has been described with reference to specific examples, it will be appreciated by those skilled in the art that the invention may be embodied in many other forms.

I claim:

1. A handheld mobile image-sensing device comprising:
    a support structure;
    an image sensor positioned on the support structure for sensing an image;
    a display positioned on the support structure and operatively connected to the image sensor for displaying the image sensed by the image sensor;
    a printing mechanism positioned on the support structure and operatively connected to the image sensor to print the image sensed by the image sensor;
    a receptacle for receiving an ink cartridge containing at least one ink for supply to the printing mechanism, the receptacle including an interface for interrogating an authentication mechanism of the cartridge; and
    a mobile telephone system positioned on the support structure and operatively connected to the image sensor to transmit data representing the image.

2. An image-sensing device as claimed in claim 1, in which the image sensor is in the form of a camera device capable of storing images on demand.

3. An image-sensing device as claimed in claim 1, in which the printing mechanism includes a pagewidth printer and processing circuitry to control operation of the printer.

4. An image sensing device as claimed in claim 3, in which the printer includes a pagewidth printhead and an ink distribution unit that is positioned on the printhead to supply ink to the printhead.

5. An image sensing device as claimed in claim 4, which includes a print media feed mechanism for feeding print media relative to the printhead so that a printing operation can be carried out on the print media.

6. An image-sensing device as claimed in claim 1, in which the display is a color, LCD display.

* * * * *